(12) United States Patent
Nee

(10) Patent No.: US 8,532,145 B2
(45) Date of Patent: *Sep. 10, 2013

(54) METHOD AND APPARATUS FOR CHANNELIZING SAMPLED BROADBAND SIGNAL

(75) Inventor: Chi-Ping Nee, Santee, CA (US)

(73) Assignee: Conexant Systems, Inc., Irvine, CA (US)

(*) Notice: Subject to any disclaimer, the term of this patent is extended or adjusted under 35 U.S.C. 154(b) by 142 days.

This patent is subject to a terminal disclaimer.

(21) Appl. No.: 13/181,376

(22) Filed: Jul. 12, 2011

(65) Prior Publication Data

US 2011/0268138 A1    Nov. 3, 2011

Related U.S. Application Data

(63) Continuation of application No. 12/178,179, filed on Jul. 23, 2008, now Pat. No. 7,983,306.

(51) Int. Cl.
*H04J 1/00* (2006.01)

(52) U.S. Cl.
USPC .......................................... 370/480; 370/302

(58) Field of Classification Search
USPC ............... 370/480–484, 281, 295, 302, 343
See application file for complete search history.

(56) References Cited

U.S. PATENT DOCUMENTS

| | | |
|---|---|---|
| 5,283,531 A | 2/1994 | Serizawa et al. |
| 2003/0007463 A1 | 1/2003 | Li et al. |
| 2004/0066312 A1 | 4/2004 | Hoctor et al. |
| 2005/0084112 A1 | 4/2005 | Kim et al. |
| 2006/0056496 A1 | 3/2006 | Smee et al. |
| 2006/0181457 A1 | 8/2006 | Bartz |

*Primary Examiner* — Gary Mui
(74) *Attorney, Agent, or Firm* — Jackson Walker L.L.P.; Christopher J. Rourk

(57) ABSTRACT

A system for isolating individual channels in a broadcast signal is provided. The system includes a plurality of multipliers, each having an input and an output. A summer coupled to the outputs of each of the plurality of multipliers is provided to generate an output. A multiplication factor system provides a multiplication factor to each of the multipliers to select a predetermined frequency channel of the input signal.

19 Claims, 2 Drawing Sheets

METHOD AND APPARATUS FOR CHANNELIZING SAMPLED BROADBAND SIGNAL

The present application is a continuation of U.S. Ser. No. 12/178,179 filed Jul. 23, 2008, entitled "METHOD AND APPARATUS FOR CHANNELIZING SAMPLED BROADBAND" which is hereby incorporated by reference for all purposes.

FIELD OF THE INVENTION

The invention relates to reception and processing of broadband signals, and more specifically to a method and apparatus for channelizing a sampled broadband signal that does not require the signal to be down-mixed.

BACKGROUND OF THE INVENTION

In order to extract a channel of data from a broadband signal, it is necessary to down-mix the received broadband signal, to filter the signal, and to perform other processing to isolate the desired channel. Where the broadband signal is digitally processed, the sampling frequency may be much greater than the desired signal processing frequency, such that decimation of the sampled data is also required. These processes add cost to the signal processing circuitry and increase the power consumption requirements for the signal processing circuitry.

SUMMARY OF THE INVENTION

The current invention provides an apparatus and method for channelization of a broadband signal that does not require mixing, filtering or decimation of the received signal.

In accordance with an exemplary embodiment of the present invention, a system for isolating individual channels in a broadband signal is provided. The system includes a plurality of multipliers, each having an input and an output. A summer coupled to the outputs of each of the plurality of multipliers is provided to generate an output. A multiplication factor system provides a multiplication factor to each of the multipliers to select a predetermined frequency channel of the input signal.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
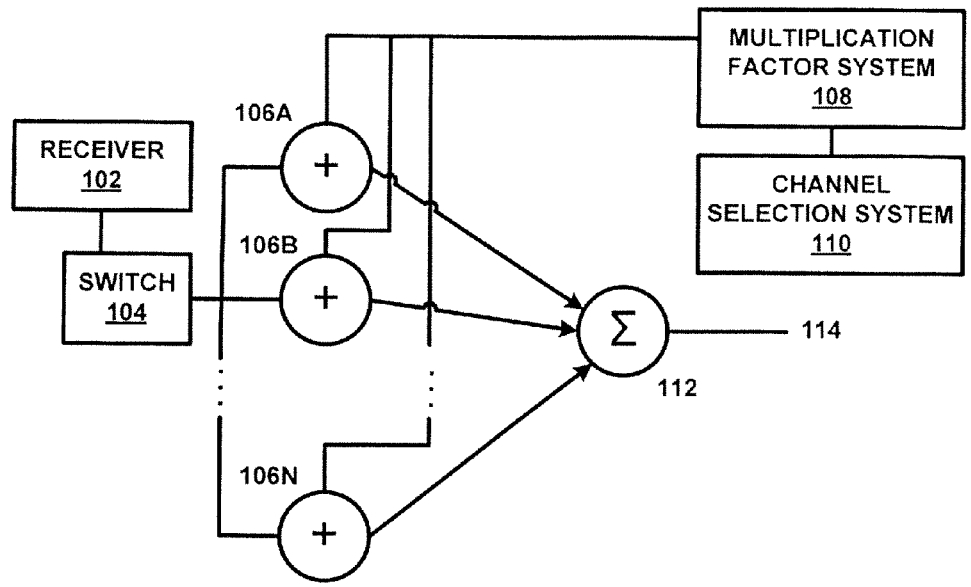
FIG. 1 is a diagram of a system for channelization of a broadband signal in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a system 100 for channelization of a broadband signal in accordance with an exemplary embodiment of the present invention. System 100 can be implemented in hardware, software or a suitable combination of hardware and software, and can be one or more discrete hardware systems. As used herein, "hardware" can include a combination of discrete components, an integrated circuit, an application-specific integrated circuit, a field programmable gate array, a digital signal processor, or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system, and one more lines oz code or other suitable software structures operating in a specific purpose software application.

System 100 includes receiver 102, which receives a broadband signal and performs suitable processing on the broadband signal. In one exemplary embodiment, receiver 102 can amplify the broadband signal, can sample the broadband signal at a suitable sampling frequency, and can perform other suitable processing.

Receiver 102 is coupled to switch 104. As used herein, the term "coupled" and its cognate terms such as "couples" or "couple," can include a physical connection (such as a wire, optical fiber, or a telecommunications medium), a virtual connection (such as through randomly assigned memory locations of a data memory device or a hypertext transfer protocol (HTTP) link), a logical connection (such as through one or more semiconductor devices in an integrated circuit), other suitable connections, or a suitable combination of connections. In one exemplary embodiment, switch 104 receives a series of digital samples from receiver 102, and provides the samples in a predetermined order to multipliers 106A through 106N. Other suitable processes can also or alternatively be used, such as where switch 104 receives an analog signal and multipliers 106A to 106N perform analog to digital processing of the signal.

Multipliers 106A through 106N apply a predetermined multiplication factor to the signal provided by switch 104. In one exemplary embodiment, multiplication factor system 108 can provide multiplication factors to multipliers 106A through 106N based on a channel selection received from channel selection system 110 or other suitable systems. Likewise, multipliers 106A through 106N can have a predetermined multiplication factor, such as where system 100 is used for extracting a single predetermined channel from a broadband signal, or other suitable processes can also or alternatively be used.

Channel selection system 110 allows a channel of a broadband signal to be selected, such as based on a predetermined frequency band of interest. In one exemplary embodiment, channel selection system 110 can present user-selectable channel data, can receive control data that identifies or is correlated to a channel of data in a broadband data signal, or other suitable processes can also or alternatively be used.

Multiplication factor system 108 receives channel data from channel selection system 110 or other suitable systems and generates multiplication factor data for multipliers 106A through 106N. In one exemplary embodiment, multiplication factor system 108 can store a look-up table of multiplication factors associated with predetermined channels, can generate multiplication factors based on channel data, such as bandwidth data and center band data, or can perform other suitable processes. In another exemplary embodiment, multiplication factor system 108 can receive decimation data that identifies a down-sampling ratio, such as where the number of multipliers can be varied, the sampling rate of receiver 102 can be varied, or in other suitable manners. In this exemplary embodiment, the multiplication factors generated by multiplication factor system 108 can be coordinated with the sampling frequency and the decimation data so as to generate an output signal at a predetermined sample rate.

Summer 112 receives the multiplied outputs from multipliers 106A through 106N and sums the outputs to generate a channelized output signal at a lower sampling rate than the sampling rate of the received broadband signal. As discussed below, by selecting suitable multiplication factors for the time domain samples and adding the adjusted samples to form a single sample, the effect in the frequency domain is the same as sampling at a higher frequency, and can be used to select frequency bands of interest or channels without the need to down-mix, filter or decimate the sampled data.

In operation, system 100 channelizes a broadband signal without the need for mixers, filters, decimators or other common signal processing components. System 100 can be used in a suitable broadband receiver, such as a cable or satellite receiver, a wireless card for a notebook personal computer, a cellular telephone, a hand-held computing device, navigational devices, telecommunication devices, televisions, radios, or other suitable devices utilizing receivers. In addition, system 100 can be used to detect and compensate for timing jitter.

Figure 2:
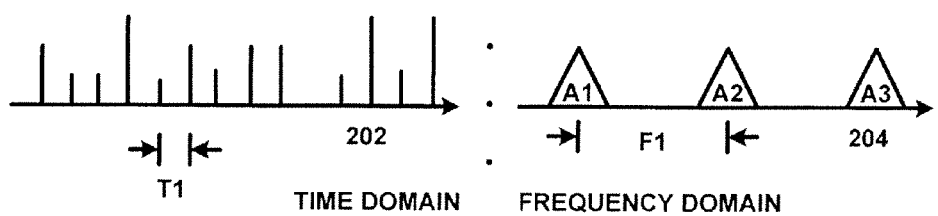
FIG. 2 is a diagram of time domain samples and associated frequency domain spectrums in accordance with an exemplary embodiment of the present invention.
Figure 2:
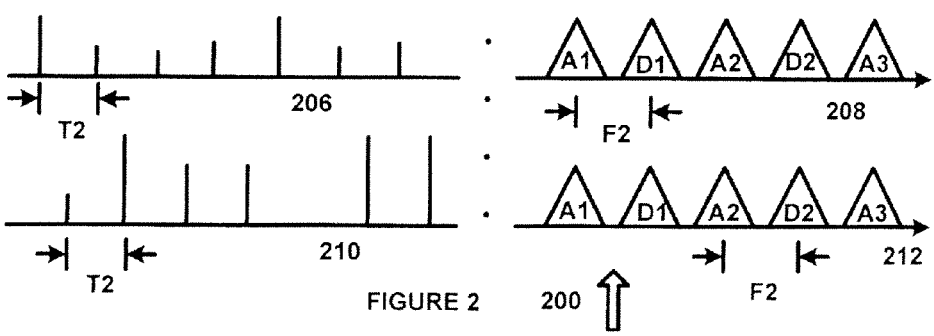

FIG. 2 is a diagram 200 of time domain samples and associated frequency domain spectrums in accordance with an exemplary embodiment of the present invention. Time domain samples 202 at a sampling time period of T1 can be transformed in the frequency domain to frequency bands A1, A2 and A3 of frequency spectrum 204, having a separation frequency F1, which equals 1/T1. If the time domain samples are separated into odd time domain samples 206 and even time domain samples 210, the associated frequency spectrums 208 and 212 will include frequency bands A1, A2 and A3, as well as frequency bands D1 and D2, each having a separation frequency of F2, which equals 1/T2. Because time domain samples 202 are the sum of time domain samples 206 and 210, frequency spectrum 204 can be generated by subtracting frequency bands D1 and D2 from frequency spectrums 208 and 212. By applying suitable multiplication factors to time domain samples 206 and 210, channelization of the associated frequency domain spectrum can be accomplished.

Figure 3:
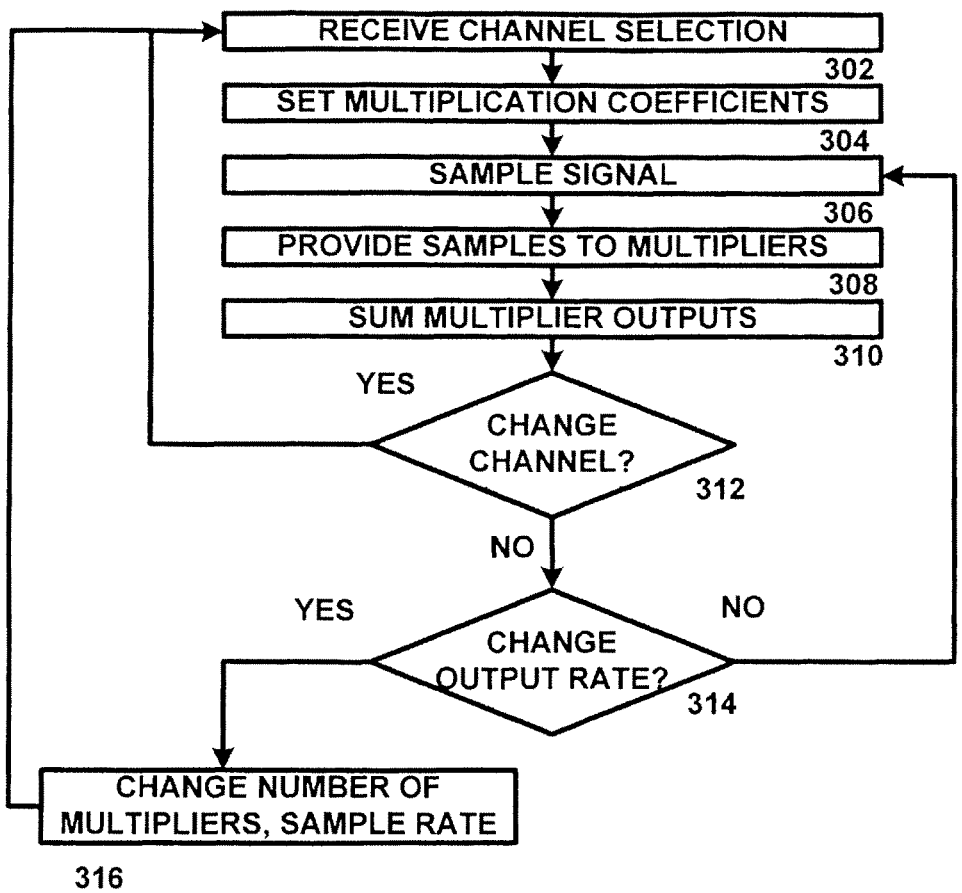
FIG. 3 is a diagram of method for channelization of a broadband signal in accordance with an exemplary embodiment of the present invention.

FIG. 3 is a diagram of method 300 for channelzataon of a broadband signal in accordance with an exemplary embodiment of the present invention. Method 300 begins at 302, where a channel selection is received. In one exemplary embodiment, the channel selection can be a predetermined frequency channel, can be a frequency band, or other suitable selections can be used. The method then proceeds to 304.

At 304, multiplication coefficients for the selected channel are set. In one exemplary embodiment, the multiplication coefficients can be obtained from a look-up table, can be calculated based on the sample rate and frequency channel data, or other suitable processes can be used. The method then proceeds to 306.

At 306, a broadband signal is sampled in the time domain. In one exemplary embodiment, a received and amplified signal can be sampled at a predetermined sampling frequency, the sampling frequency can be set based on the selected channel, or other suitable processes can also or alternatively be used. The method then proceeds to 308.

At 308, the samples are provided to multipliers that utilize the multiplication coefficients. In one exemplary embodiment, the samples can be provided in a predetermined order, and the multiplied sample values can be stored. The method then proceeds to 310.

At 310, the multiplier outputs are summed, such as by adding the multiplied sample values from each multiplier, by storing the multiplied sample values until a complete set of samples is obtained, or in other suitable manners. The sum is then output at a sample rate that is lower than the input sample rate by a factor related to the number of multipliers. The method then proceeds to 312.

At 312, it is determined whether a change in channel is required. In one exemplary embodiment, the change in channel can be received as a control, can be performed based upon predetermined channel selection data, or can be performed in other suitable manners. If it is determined that a change in channel is required, the method returns to 302, otherwise the method proceeds to 314.

At 314, it is determined whether a change in the output sample rate is required. In one exemplary embodiment, sample rate control data can be received to change the sample rate of the output signal, predetermined sample rate selection data can be used, or other suitable processes can also or alternatively be used. If it is determined that a change in the sample rate is required, the method proceeds to 316, where the number of multipliers, the sample rate of the input samples, the multiplication coefficients, or other suitable variables are adjusted to generate data for the selected frequency channel at the selected sample rate. The method then returns to 302. Otherwise, the method returns to 306.

In operation, method 300 allows a broadband signal to be sampled and processed to select a channel of data without the need for down-mixing, filtering and decimation. Method 300 can be used to selected predetermined or adjustable frequency channels in a broadband signal without the need to change oscillator frequencies, decimators, or other parameters.

Although exemplary embodiments of an apparatus of the present invention have been described in detail herein, those skilled in the art will also recognize that various substitutions and modifications can be made to the apparatus without departing from the scope and spirit of the appended claims.

What is claimed is:

1. A system for isolating individual channels comprising:
   a receiver for receiving a transmitted signal and generating an input signal;
   a switch coupled to the receiver, the switch receiving the input signal;
   a plurality of multipliers, each having an input coupled to the switch and an output, each receiving the input signal from the switch;
   a summer coupled to the outputs of each of the plurality of multipliers for generating an output; and
   a multiplication factor system for providing multiplication factors to the multipliers, wherein a predetermined frequency channel of the transmitted signal is selected as a function of the multiplication factors.

2. The system of claim 1 wherein the switch selects one of the multipliers so as to provide the input signal to the selected multiplier.

3. The system of claim 2, wherein the switch can select a different multiplier for each one of a succession of digital samples.

4. The system of claim 3 wherein a sample rate of the output can be less than a sample rate of an input signal.

5. The system of claim 1 wherein each multiplier can process a digital signal.

6. The system of claim 1 further comprising a channel selector system to generate the multiplication factor for the multiplication factor system.

7. The system of claim 1 wherein the receiver receives the transmitted signal and generates the input signal by sampling the received signal at a sampling frequency.

8. A method for isolating individual channels in a broadband signal comprising:
    receiving a transmitted signal;
    generating a received signal from the transmitted signal;
    switching the transmitted signal to a plurality of multipliers;
    multiplying the received signal with the plurality of multipliers, each multiplier having an associated multiplication factor;
    summing the outputs of the multipliers; and
    generating an output signal representing a selected frequency band of the received signal from the summed multiplier outputs.

9. The method of claim 8 further comprising switching the received signal from a first multiplier to a second multiplier.

10. The method of claim 8 further comprising:
    converting the received signal into a sequence of digital samples; and
    wherein multiplying the received signal with the plurality of multipliers comprises providing successive digital samples to different multipliers.

11. The method of claim 8 further comprising:
    receiving channel selection data; and
    generating the multiplication factors in response to the channel selection data.

12. The method of claim 8 wherein generating the output signal representing the frequency band of the received signal from the summed multiplier outputs further comprises generating the output signal at a lower sample rate than a sample rate of the received signal.

13. An apparatus for isolating individual signals in a broadband signal comprising:
    means for multiplying each of a plurality of inputs by a corresponding scaling factor;
    a summer coupled to the outputs of each of the plurality of multipliers to generate an output; and
    wherein the scaling factors applied to the inputs select a predetermined channel of a signal.

14. The apparatus of claim 13 further comprising a switch for providing a sequence of samples to the means for multiplying each of the plurality of inputs by the corresponding scaling factor.

15. The apparatus of claim 14, wherein the plurality of inputs comprises a series of digital samples and comprising a switch for selecting one of a plurality of different multipliers for each successive digital sample.

16. The apparatus of claim 15 wherein a sample rate of the output can be less than a sample rate of the series of digital samples.

17. The apparatus of claim 13 wherein the plurality of inputs comprises a digital signal.

18. The apparatus of claim 13 further comprising means for generating the scaling factors in response to channel selection data.

19. The apparatus of claim 13 further comprising means for receiving a signal and generating the plurality of inputs.

* * * * *